United States Patent Office 3,067,217
Patented Dec. 4, 1962

3,067,217
PROCESS OF PRODUCING 21-HEXAHYDROBEN-
ZOATES OF ADRENOCORTICAL HORMONES
Georges Muller and Leon Velluz, Paris, France, assignors, by mesne assignments, to Roussel-UCLAF, S.A., Paris, France, a corporation of France
No Drawing. Filed May 3, 1955, Ser. No. 505,833
Claims priority, application France May 14, 1954
2 Claims. (Cl. 260—397.45)

The present invention relates to new esters of adrenal cortical hormones and more particularly to new esters of adrenal cortical hormones with hexahydrobenzoic acid, said new esters having a considerably prolonged activity, and to a process of making same.

The adrenal cortical hormone and especially cortisone (11-dehydro-17α-hydroxy corticosterone), hydrocortisone (17α-hydroxy corticosterone), and desoxycorticosterone, are marketed and therapeutically employed in the form of their 21-acetate compounds. The physiological activity of said esters, however, is not very prolonged. Formula I illustrates the known 21-acetate compounds.

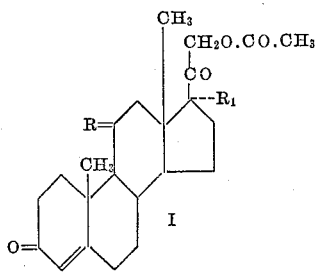

In said formula R indicates two hydrogen atoms or a secondary alcohol group or a keto group, and $R_1$ indicates hydrogen or the hydroxyl group.

The high price of said adrenal cortical hormones and the necessity of repeated and frequent administration of said hormones when employed as such or in the form of their acetates have induced the scientists and the pharmaceutical industry to look for derivatives of said hormones the activity of which is considerably prolonged. Heretofore, however, attempts to produce such compounds of prolonged activity have failed.

It is one object of the present invention to solve this problem and to provide derivatives of said adrenal cortical hormones which have such a considerably prolonged activity and which, therefore, are especially suitable in therapy.

Another object of the present invention is to provide a simple and effective process of making such new derivatives of adrenal cortical hormones of considerably prolonged activity.

A further object of the present invention is to provide a therapeutic composition comprising a derivative of an adrenal cortical hormone of considerably prolonged activity.

Other objects of the present invention and advantageous features thereof will become apparent as the description proceeds.

In principle, the present invention consists in providing new esters of adrenal cortical hormones with hexahydrobenzoic acid, said esters corresponding to Formula II.

Said new 21-hexahydrobenzoates possess a considerably prolonged physiological activity which renders them especially suitable for human and veterinary therapy.

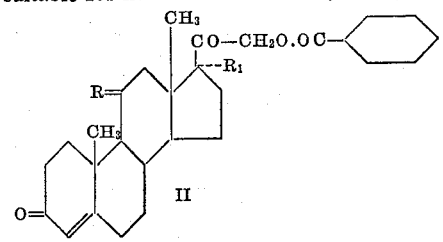

In said formula R and $R_1$ indicate the same substituents as mentioned hereinabove.

The new hexahydrobenzoates of adrenal cortical hormones permit administration of said hormones by injection at greater intervals as heretofore possible. Thereby, an over-supply of the hormones to the organism is avoided since comparatively slow and continuous absorption takes place.

It is entirely unexpected that the hexahydrobenzoates of adrenal cortical hormones produce such an advantageous result since the 21-benzoates of said hormones, i.e. their non-hydrogenated analogues, do not exhibit any prolonged activity. There is no indication in the prior art that saturation of aromatic double bonds is an esterifying agent will permit the preparation of esters of very considerably prolonged activity.

The new esters can be employed in solution in neutral vegetable oils to which a glycol may be added, or insolutions in other injectable organic solvents. Said compounds can also be converted into injectable emulsions in water or solutions in other solvents in the presence of a neutral, non-irritating emulsifying agent.

The new esters are preferably prepared by reacting the acid chloride or acid bromide of hexahydrobenzoic acid of Formula III.

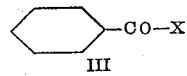

wherein X represents halogen, with the free hormone in the presence of a tertiary base such as 2-methyl-5-ethyl pyridine, pyridine, or triethylamine. The reaction mixture is preferably diluted by means of an organic solvent during said reaction.

After esterification is completed, the reaction mixture is extracted by means of a water-immiscible organic solvent such as ether, benzene, etc., washed with an acid agent to eliminate excess of the tertiary base employed, thereafter with an alkaline agent to eliminate excess of non-reacted acid and the acid washing agent, and finally with water. The solution is dried, the solvent is removed by distillation, and the ester is recrystallized from a suitable solvent. The resulting product is of sufficient purity to be used directly for therapeutical purposes.

In place of the acid halogenide, it is possible to employ the anhydride of hexahydrobenzoic acid in the presence of a tertiary base. The yields obtained thereby, however, are somewhat lower than when using the acid halogenides.

If it is desired to utilize the hexahydrobenzoate in microcrystalline suspension, known processes for converting the crystals of said esters into microcrystals are employed. Especially suitable is the process of grinding and milling the crystals in aqueous medium in the presence of a protective colloid such as carboxy methyl cellulose.

The free hormones serving as starting materials for the process according to the present invention are obtained either by saponification of their acetates as they are commercially employed or directly by synthesis. The hexahydrobenzoylchloride is advantageously obtained by the action of thionylchloride upon hexahydrobenzoic acid according to the process described by Darzens and Rost (Comptes rendus volume 153 [1911] page 773). The acid bromide can readily be obtained by the action of phosphorus pentabromide upon hexahydrobenzoic acid.

It is, of course, understood that the adrenal cortical hormones can also be esterified by means of free hexahydrobenzoic acid in the presence of an esterifying catalyst. The yield, when using the free acid, however, is lower than when working with hexahydrobenzoylchloride or -bromide.

The new esters are very readily soluble in chloroform.

The following examples serve to illustrate the present invention without, however, limiting the same thereto.

EXAMPLE 1

*21-Hexahydrobenzoate of Hydrocortisone*

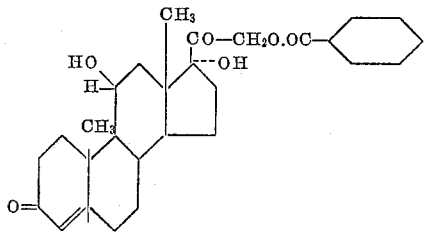

3 g. of hydrocortisone are dissolved in a mixture of anhydrous pyridine and benzene 1 : 1. The solution is cooled and a solution of 1.5 cc. of hexahydrobenzoylchloride in benzene is slowly added thereto. After allowing the reaction mixture to stand at room temperature, is is diluted with water, extracted with benzene, the benzene solution is separated by decanting, washed first with N hydrochloric acid, then with N sodium hydroxide solution and with water, dried, the benzene is distilled off, and the residue is recrystallized from methanol. 3 g. of the 21-hexahydrobenzoate of hydrocortisone melting, on the Maquenne block, at 172° C. and, subsequently, at 234° C. and having a rotatory power $[\alpha]_D^{20} = +140°$ (concentration: 1% in chloroform) are obtained thereby. The yield amounts to 77% of the theoretical yield. The resulting 21-hexahydrobenzoate of hydrocortisone is insoluble in water, slightly soluble in acetic acid, ethyl ester, methanol, and benzene, and very soluble in chloroform. Its molecular weight is 472.6.

*Analysis.*—Calculated for $C_{28}H_{40}O_6$: 71.16% C; 8.53% H. Found: 71.2% C; 8.3% H.

The same compound is obtained when using hexahydrobenzoyl bromide prepared according to the procedure described by Wagner and Moore (Journ. Am. Chem. Soc. volume 72 [1950], page 974), while otherwise proceeding under the same reaction conditions as stated hereinabove.

EXAMPLE 2

*21-Hexahydrobenzoate of Cortisone*

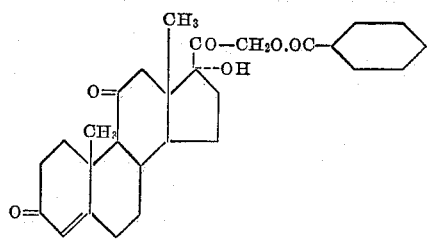

3.3 g. of cortisone are reacted with hexahydrobenzoylchloride in benzene in the same manner as described hereinabove in Example 1. Thereby, 3.2 g. of the ester melting, on the Maquenne block, at 219° C. and having a rotatory power $[\alpha]_D = +195°$ (concentration: 1% in chloroform) are obtained. The molecular weight is 470.6. The yield amounts to 75% of the theoretical yield. The 21-hexahydrobenzoate of cortisone is insoluble in water, slightly soluble in methanol, and soluble in chloroform.

*Analysis.*—Calculated for $C_{28}H_{38}O_6$: 71.46% C; 8.14% H; 20.40% O. Found: 71.2% C; 8.0% H; 20.5% O.

EXAMPLE 3

*21-Hexahydrobenzoate of Desoxycorticosterone*

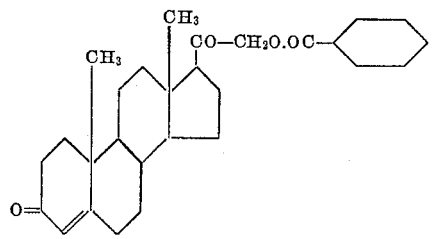

3.8 g. of desoxycorticosterone are reacted with hexahydrobenzoylchloride in benzene in the same manner as described hereinabove in Example 1. The resulting reaction product is recrystallized from di-isopropyl ether. Thereby, 3.9 g. of the ester melting, on the Maquenne block, at 113–114° C. and having a rotatory power $[\alpha]_D^{20} = +163 \pm 3°$ (concentration: 1% in ethanol) are obtained. The yield amounts to 77% of the theoretical yield. The molecular weight is 440.6. The 21-hexahydrobenzoate of desoxycorticosterone is insoluble in water, slightly soluble in di-isopropyl ether, and soluble in acetone and chloroform.

*Analysis.*—Calculated for $C_{28}H_{40}O_4$: 76.3% C; 9.2% H; 14.5% O. Found: 76.3% C; 9.3% H; 14.7% O.

EXAMPLE 4

3 g. of hydrocortisone are dissolved in anhydrous pyridine. 3.0 g. of hexahydrobenzoic acid anhydride are added to said solution. Said hexahydrobenzoic acid anhydride of the melting point 25° C. is prepared according to the process described by Bartlett and Rylander (Journ. Am. Chem. Soc. vol. 73 [1951], page 4275). The reaction mixture is allowed to stand for 16 hours and is then heated on the water bath for 3 more hours in order to complete the reaction. The mixture is cooled, poured into water, and extracted with benzene. The combined benzene extracts are washed with dilute hydrochloric acid, then with sodium hydroxide solution and finally with water. The benzene solution treated in this manner is evaporated to dryness. On recrystallization from methanol, 1.5 g. of 21-hexahydrobenzoate of hydrocortisone are obtained corresponding to a yield of 38% of the theoretical yield. The resulting compound corresponds in its characteristic properties to that obtained according to the process of Example 1.

EXAMPLE 5

3.3 g. of cortisone are reacted with the anhydride of hexahydrobenzoic acid in the same manner as described hereinabove in Example 4. The resulting reaction product is identical with that obtained according to Example 2. The yield amounts to 2 g. corresponding to 47% of the theoretical yield.

EXAMPLE 6

3.8 g. of desoxycorticosterone are reacted with the anhydride of hexahydrobenzoic acid in the same manner as described hereinabove in Example 4. 1 g. of the 21-hexahydrobenzoate of desoxycorticosterone melting at 113–114° C. is obtained thereby.

EXAMPLE 7

2.2 g. of $\Delta_{1,4}$-pregnadiene-17α,21-diol-3,11,20-trione, known as metacortandracin are reacted with 2.2 cc. of hexahydrobenzoylchloride in the same manner as described hereinabove in Example 1. 2.6 g. of the 21-hexahydrobenzoate of metacortandracin melting at 272° C. and having a rotatory power $[\alpha]_D^{20} = +172° \pm 2°$ (concentration: 0.5% in dioxane) are obtained thereby. The yield amounts 90% of the theoretical yield. The product is insoluble in water, slightly soluble in benzene and acetone. Its molecular weight is 468.6.

*Analysis.*—Calculated for $C_{28}H_{36}O_6$: 71.8% C; 7.7% H; 20.5% O. Found: 72.0% C; 7.8% H; 20.3% O.

EXAMPLE 8

0.5 g. of $\Delta_{1,4}$-pregnadiene-11β,17α,21-triol-3,20-dione, known as metacortandralone are reacted with 0.5 cc. of hexahydrobenzoylchloride in the same manner as described hereinabove in Example 1. 0.5 g. of the 21-hexahydrobenzoate of metacortandralone melting at 245° C. and having a rotatory power $[\alpha]_D^{20} = +106° \pm 2°$ (concentration: 0.5% in dioxane) are obtained thereby. The yield amounts 77% of the theoretical yield. The product is insoluble in water, slightly soluble in acetone and soluble in chloroform.

EXAMPLE 9

2.5 g. of hexahydrobenzoate of hydrocortisone, 0.9 g. of benzyl alcohol, 0.4 g. of the mono-oleate of polyoxy ethylene sorbitol, 0.3 g. of carboxy methyl cellulose, 0.3 g. of chloro butanol, 0.80 g. of sodium chloride, and sufficient water to yield 100 cc. are ground in a ball mill until a microcrystalline suspension of the hormone in the water is obtained. The suspension is adapted for intramuscular injection.

EXAMPLE 10

95 cc. of neutral olive oil are agitated at a temperature of 30° with 2 g. of aluminium 2-ethyl caproate for 15 minutes. The resulting mixture is heated to about 120° C. while continuing agitation. 2.5 g. of the hexahydrobenzoate of hydrocortisone are added thereto, and the mixture is slowly cooled to room temperature yielding a gel which can be administered by intramuscular injection and exerts a considerably prolonged activity.

Other esters of hexahydrobenzoic acid with adrenal cortical hormones obtained according to the present invention can also be converted into pharmaceutical preparations of similar composition and usefulness.

Likewise, it is possible to produce the hexahydrobenzoic acid esters of the recently synthesized valuable adrenal cortical hormones having two double bonds in ring A of the steroid ring system and corresponding to Formula IV

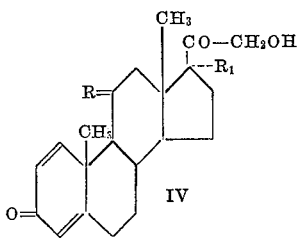

IV wherein R indicates two hydrogen atoms, a secondary alcohol group, or a keto group, and $R_1$ indicates hydrogen or the hydroxyl group, namely the $\Delta_{1,4}$-pregnadiene-17α,21-diol-3,11,20-trione, known as metacortandracin, and $\Delta_{1,4}$-pregnadiene-11β,17α,21-triol-3,20-dione, known as metacortandralone. Said compounds are about 3 to 4 times more effective than cortisone. The esters of these compounds are also of considerably prolonged activity.

The compounds of the adrenal cortical hormone series according to the present invention, thus correspond to Formula V

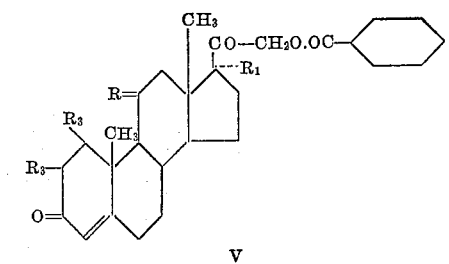

V wherein R indicates two hydrogen atoms, a secondary hydroxy group, or a keto group, $R_1$ indicates hydrogen or a hydroxyl group and $R_2$ and $R_3$ each hydrogen or both together forming a double bond in ring A of said hormones.

As stated hereinabove, the new 21-hexahydrobenzoates of adrenal cortical hormones have a considerably prolonged activity. While, for instance, on treating the experimental arthritis of the rat cortisone acetate requires, on parenteral administration, a daily dosage of 12.5 mg. for about 10 days, cortisone hexahydrobenzoate produces the same therapeutic effect with a single dosage of 59 mg. One single injection of the new ester, thus, is capable of replacing 10 injections which were heretofore required.

In place of pyridine as used in the preceding examples there can be employed other bases such as 2-methyl-5-ethyl-pyridine, triethylamine, collidine and tributylamine.

In place of benzene as used in this process there can be employed other solvents such as chloroform, ether and toluene provided the compounds to be reacted are substantially soluble therein.

Of course many changes and variations in the reaction components, the reaction conditions, temperature, and duration, the solvents used, the methods of working up the reaction mixture and of isolating and purifying the reaction products and the like may be made by those skilled in the art in accordance with the principles set forth herein and in the claims annexed hereto.

We claim:

1. In a process of producing 21-hexahydrobenzoates of adrenocortical hormones selected from the group consisting of cortisone, hydrocortisone, desoxycorticosterone, $\Delta_{1,4}$-pregnadiene-17α,21-diol-3,11,20-trione, and $\Delta_{1,4}$-pregnadine-11β,17α,21-triol-3,20-dione, the steps which comprise dissolving the adrenocortical hormone in a mixture of pyridine and benzene, adding slowly a solution of hexahydrobenzoylchloride in benzene at room temperature to said hormone solution, allowing the mixture to stand at room temperature to complete esterification and recovering the said 21-hexahydrobenzoate of the adrenocortical hormone.

2. In a process of producing 21-hexahydrobenzoates of adrenocortical hormones, selected from the group consisting of cortisone, hydrocortisone, desoxycorticosterone, $\Delta_{1,4}$-pregnadiene-17α,21-diol-3,11,20-trione, and $\Delta_{1,4}$-pregnadiene-11β,17α,21-triol-3,20-dione, the steps which comprise dissolving the adrenocortical hormone in anhydrous pyridine, adding to the resulting solution hexahydrobenzoic acid anhydride, allowing the mixture to stand at room temperature and heating the mixture on the water bath to complete esterification and recovering the said 21-hexahydrobenzoate of the adrenocortical hormone.

(References on following page)

References Cited in the file of this patent

UNITED STATES PATENTS

| | | | |
|---|---|---|---|
| 2,109,400 | Miescher | Feb. 22, | 1938 |
| 2,183,589 | Reichstein | Dec. 19, | 1939 |
| 2,602,769 | Murray et al. | July 8, | 1952 |
| 2,655,517 | Slomp | Oct. 13, | 1953 |
| 2,751,402 | Schneider | June 19, | 1956 |
| 2,773,888 | Oliveto et al. | Dec. 11, | 1956 |
| 2,783,226 | Gould et al. | Feb. 26, | 1957 |
| 2,871,160 | Johnson et al. | Jan. 27, | 1959 |

FOREIGN PATENTS

| | | | |
|---|---|---|---|
| 712,948 | Great Britain | Aug. 4, | 1954 |
| 716,297 | Great Britain | Sept. 29, | 1954 |
| 902,300 | Germany | Jan. 21, | 1954 |